US008548018B2

(12) United States Patent
Honda et al.

(10) Patent No.: US 8,548,018 B2
(45) Date of Patent: Oct. 1, 2013

(54) COMMAND APPARATUS IN A GAS LASER OSCILLATOR, CAPABLE OF COMMAND AT HIGH SPEED AND WITH HIGH PRECISION

(75) Inventors: Masahiro Honda, Minamitsuru-gun (JP); Hajime Ikemoto, Minamitsuru-gun (JP)

(73) Assignee: FANUC Corporation, Minamitsuru-gun, Yamanashi (JP)

( * ) Notice: Subject to any disclaimer, the term of this patent is extended or adjusted under 35 U.S.C. 154(b) by 0 days.

(21) Appl. No.: 13/536,018

(22) Filed: Jun. 28, 2012

(65) Prior Publication Data
US 2013/0016747 A1 Jan. 17, 2013

(30) Foreign Application Priority Data

Jul. 15, 2011 (JP) .................................. 2011-156689

(51) Int. Cl.
*H01S 3/00* (2006.01)
*H01S 3/03* (2006.01)

(52) U.S. Cl.
USPC .............. 372/38.02; 372/29.012; 372/29.015; 372/38.07; 372/38.04; 372/61; 372/62; 372/64

(58) Field of Classification Search
USPC ................. 372/29.012, 29.015, 38.02, 38.07, 372/38.04, 61, 62, 64
See application file for complete search history.

(56) References Cited

U.S. PATENT DOCUMENTS

| 4,701,925 | A | * | 10/1987 | Fuke et al. | ................ | 372/29.015 |
| 4,794,603 | A | * | 12/1988 | Koseki | ........................ | 372/38.04 |
| 4,823,350 | A | * | 4/1989 | Yamazaki | ................... | 372/38.04 |
| 4,921,357 | A | | 5/1990 | Karube et al. | | |
| 4,930,135 | A | | 5/1990 | Karube et al. | | |
| 5,097,475 | A | * | 3/1992 | Perzl et al. | ........................ | 372/87 |
| 5,434,880 | A | * | 7/1995 | Burrows et al. | ................... | 372/69 |
| 6,097,747 | A | * | 8/2000 | Iehisa et al. | ................ | 372/38.07 |
| 2002/0141470 | A1 | | 10/2002 | Nakao et al. | | |
| 2004/0125850 | A1 | * | 7/2004 | Hayashikawa et al. | ......... | 372/85 |
| 2006/0209917 | A1 | | 9/2006 | Fallon et al. | | |
| 2008/0144681 | A1 | * | 6/2008 | Egawa et al. | ............... | 372/38.04 |
| 2008/0304533 | A1 | * | 12/2008 | Ando et al. | ..................... | 372/58 |
| 2009/0116521 | A1 | * | 5/2009 | Ando et al. | ..................... | 372/33 |
| 2011/0243165 | A1 | * | 10/2011 | Honda et al. | ............. | 372/29.021 |
| 2011/0243168 | A1 | * | 10/2011 | Ikemoto et al. | ............. | 372/38.07 |

FOREIGN PATENT DOCUMENTS

| JP | 62-249494 | 10/1987 |
| JP | 63-273377 | 11/1988 |
| JP | 63-273378 | 11/1988 |
| JP | 07-122798 | 5/1995 |
| JP | 07-122799 | 5/1995 |

(Continued)

*Primary Examiner* — Jessica Stultz
*Assistant Examiner* — Joshua King
(74) *Attorney, Agent, or Firm* — Drinker Biddle & Reath LLP

(57) ABSTRACT

A command apparatus (10) for a plurality of laser power supplies (11, 12) comprises: a command generating section (5) generating commands for the laser power supplies; and a separating section (36) separating the generated commands into a bias command, an output command, an offset command and a gain command, wherein the bias command and the output command are common to the laser power supplies, the offset command and the gain command are defined at least in accordance with the discharge tubes corresponding to the laser power supplies respectively, wherein the command apparatus further comprises a transmitting section (37) transmitting, to the laser power supplies, the bias and the output command which are common to the laser power supplies and, transmitting the offset and the gain command defined at least in accordance with the discharge tubes corresponding to the laser power supplies respectively, corresponding to the laser power supplies.

3 Claims, 3 Drawing Sheets

(56) References Cited

FOREIGN PATENT DOCUMENTS

| JP | 2633288 | 7/1997 |
| JP | 2002-353545 | 12/2002 |
| JP | 2006-344722 | 12/2006 |
| JP | 4141562 | 8/2008 |

\* cited by examiner

COMMAND APPARATUS IN A GAS LASER OSCILLATOR, CAPABLE OF COMMAND AT HIGH SPEED AND WITH HIGH PRECISION

RELATED APPLICATION DATA

This application claims priority under 35 U.S.C. §119 and/or §365 to Japanese Application No. 2011-156689 filed Jul. 15, 2011, the entire contents of which are incorporated herein by reference.

BACKGROUND OF THE INVENTION

1. Field of the Invention

The present invention relates to a command apparatus in a gas laser oscillator. In particular, the present invention relates to a command apparatus in a gas laser oscillator, capable of commanding at high speed and with high precision.

2. Description of the Related Art

Conventionally, a gas laser oscillator is equipped with a plurality of laser power supplies according to required laser output. FIG. 3 illustrates an example of the gas laser oscillator in a related art, which is equipped with two laser power supplies. Gas laser oscillator 200 illustrated in FIG. 3 is equipped with two laser power supplies 110, 120. As illustrated in FIG. 3, commands generated in a CNC are transmitted to a communication IC 350 of an output command apparatus 100, and is separated into a bias command 410 and an output command 420.

These commands are applied D/A conversions by D/A converters 440a, 440b respectively, thereafter, added by an adder circuit 460. Subsequently, the added analog command voltage is commonly transmitted to each of laser power supplies 110, 120. The laser power supplies supply electric power, which is proportional to the analog command voltage, to electrodes 230, 240 of discharge tubes 210, 220 of the gas laser oscillator 200 through matching units 150, 160. According to these processes, the laser output from the gas laser oscillator 200 is controlled.

Generally, a certain bias command is always transmitted during a laser operational status, i.e., in a state where a laser beam can be output. The laser output from the gas laser oscillator 200 is controlled by changing the output command which should be added to the bias command.

The bias commands and the output command have a common value with respect to both of the laser power supplies 110, 120. In this connection, there are variations in characteristics of the electrodes 230, 240 of the discharge tubes 210, 220 in a laser gas circulation pass 250 of the gas laser oscillator 200, pressure of the laser gas in the discharge tubes 210, 220, auxiliary electrodes 310, 320 which are arranged adjacent to the electrodes 230, 240 respectively, and the matching units 150, 160. Hereinafter, these may be collectively referred to as loads of the laser power supplies.

To address the variations, in the related art, the command voltage adjustment circuits 130, 140 are provided in the laser power supplies 110, 120 respectively. These command voltage adjustment circuits 130, 140 adjusts the base discharge at the time of commanding the bias command, and adjusts the maximum injection power of the laser power supply at the time of commanding the maximum output command in each of the laser power supplies 110, 120, thereby absorbing the above-mentioned variations.

When adjusting the base discharge, only the bias command 410 is transmitted while the output command 420 is made into zero. It is visually checked by an operator that the laser oscillator 200 is in a state under a threshold value for oscillation (a laser output is 0 W), electric discharge by the discharge tubes 230, 240 being disappeared in the state, and auxiliary discharge by the auxiliary electrodes 310, 320 is maintained. Then, the operator adjusts variable resistors for offset adjustment (not illustrated) which are provided in the command voltage adjustment circuits 130, 140, respectively.

Moreover, when adjusting the maximum injection power of the laser power supplies, the bias command 410 and the maximum output command 420 are transmitted. In other words, the analog command voltage, in which the bias command and the maximum output command are added, is transmitted to the laser power supplies. The operator adjusts the variable resistors for gain adjustment (not illustrated) which are provided in the command voltage adjustment circuits 130, 140 respectively, while measuring the injection power of the laser power supplies so that the capability of the laser power supplies can be used maximally.

The number of the laser power supplies, which is provided in one oscillator, increases, as the gas laser oscillator 200 has higher output. Therefore, if the number of laser power supplies increases, it would be more complicated such that the operator would have to adjust the variable resistors of the command voltage adjustment circuits to adjust the base discharge and the maximum injection power.

In a command system disclosed in Japanese Registered Patent No. 4141562, in order to absorb the variations in the load of each laser power supply, DC current is detected to adjust the command voltage. The Japanese Registered Patent No. 4141562 requires the adjustment circuits 130, 140 in which the same analog voltage are used.

Furthermore, Japanese Registered Patent No. 2633288 discloses a laser oscillator which has an apparatus transmitting two kinds of commands, the bias command and an output command, to laser power supplies from a CNC. This system transmits the bias command and the output command independently from the CNC to each laser power supply, to adjust base discharge and maximum injection power.

However, according to Japanese Registered Patent No. 4141562, there are problems of a reduction of adjustment accuracy and a delay of response time for detection, due to variations in the command voltage adjustment circuits 130, 140 and the loads mentioned above and a change in environment such as temperature. Furthermore, there is a problem that the circuit configurations of the command voltage adjustment circuits 130, 140 are complicated. Further, the analog voltage adjustment circuit cannot manage the amounts of adjustment by the variable resistors for the offset adjustment and the gain adjustment of each laser power supply, with respect to the bias command and the output command which are same values in the plurality of power supplies. Thus, it is necessary to adjust the base discharge and the maximum injection power whenever any of the laser power supplies is broken down and is replaced.

Moreover, in Japanese Registered Patent No. 4141562, a processing defect may occur by an adjustment mistake of the base discharge. In other words, even in a state where only the bias command is transmitted and the output command is made to zero, a laser output may occur by exceeding a threshold value for oscillation of the laser oscillator. In such a case, there is a problem that a marking-off line is formed in a workpiece.

Furthermore, in Japanese Registered Patent No. 4141562, if the output command is caused to rapidly increase in a state where auxiliary discharge has disappeared, the laser power supply may be damaged due to an impedance missmatch of the laser power supply and the load. Moreover, when adjusting the maximum injection power, there are problems that a processing defect may occur due to insufficient injection power (a laser output is insufficient), and that the laser power supply, the matching unit and the discharge tube and the like are damaged due to excess injection electric power.

In Japanese Registered Patent No. 2633288, there is a problem that the number of data items to be transmitted increases (12 bit×two types×the number of the laser power supplies to be provided), if the number of the laser power supplies provided in one laser oscillator increases. Generally, the number of data items which is available is restricted according to a hardware (the communication IC) and the software in the CNC. Therefore, the number of laser power supplies is also defined according thereto. Moreover, this system, as illustrated in the flowchart of FIG. 3 (b) in Japanese Registered Patent No. 2633288, adjusts the base discharge and the maximum injection power for each of the laser power supplies in order. Accordingly, in cases where there are large number of laser power supplies, the adjustment time of the laser power supplies may be long significantly.

The present invention is made in view of such circumstances and, an object of the present invention is to provide a command apparatus in a gas laser oscillator capable of easily adjusting base discharge and maximum injection power, without lengthening adjustment time of laser power supplies even if there are large number of laser power supplies.

SUMMARY OF INVENTION

In order to achieve the above-mentioned purpose, according to the first aspect, there is provided a command apparatus for a plurality of laser power supplies in a gas laser oscillator including a plurality of discharge tubes and a plurality of electrodes corresponding to the plurality of discharge tubes, the command apparatus comprising: a command generating section generating commands for the plurality of laser power supplies; and a separating section separating the commands generated by the command generating section into a bias command, an output command, an offset command and a gain command, wherein the bias command and the output command are common to the plurality of laser power supplies, the offset command and the gain command are defined at least in accordance with the discharge tubes corresponding to the plurality of laser power supplies respectively, wherein the command apparatus further comprises a transmitting section transmitting, to each of the plurality of laser power supplies, the bias command and the output command which are common to the plurality of laser power supplies and, transmitting, in serial, the offset command and the gain command which are defined at least in accordance with the discharge tubes corresponding to the plurality of laser power supplies respectively, corresponding to each of the plurality of laser power supplies.

According to the second aspect, in the first aspect, the transmitting section includes: an addition adjustment section adding the offset command which is defined in accordance with at least one of the discharge tubes and the electrodes corresponding to the plurality of laser power supplies respectively to the bias command which is common to the plurality of laser power supplies, to adjust a base discharge in the laser oscillator; and an multiplication adjustment section multiplying the gain command which is defined in accordance with at least the discharge tubes corresponding to the plurality of laser power supplies respectively by the output command which is common to the plurality of laser power supplies, to adjust a maximum injection power in the laser oscillator.

According to the third aspect, in the first aspect, the laser oscillator includes a plurality of matching units arranged between each of the plurality of laser power supplies and the laser oscillator and, auxiliary electrodes arranged adjacent to each of the plurality of electrodes, the offset command and the gain command are defined at least in accordance with one of the discharge tubes, pressure of the discharge tubes, the matching units and the auxiliary electrodes, each of which corresponds to the plurality of laser power supplies respectively.

These objects, features and advantages of the present invention and other objects, features and advantages will become more apparent from detailed description of the typical embodiments of the present invention illustrated in accompanying drawings.

DETAILED DESCRIPTION

Figure 1:
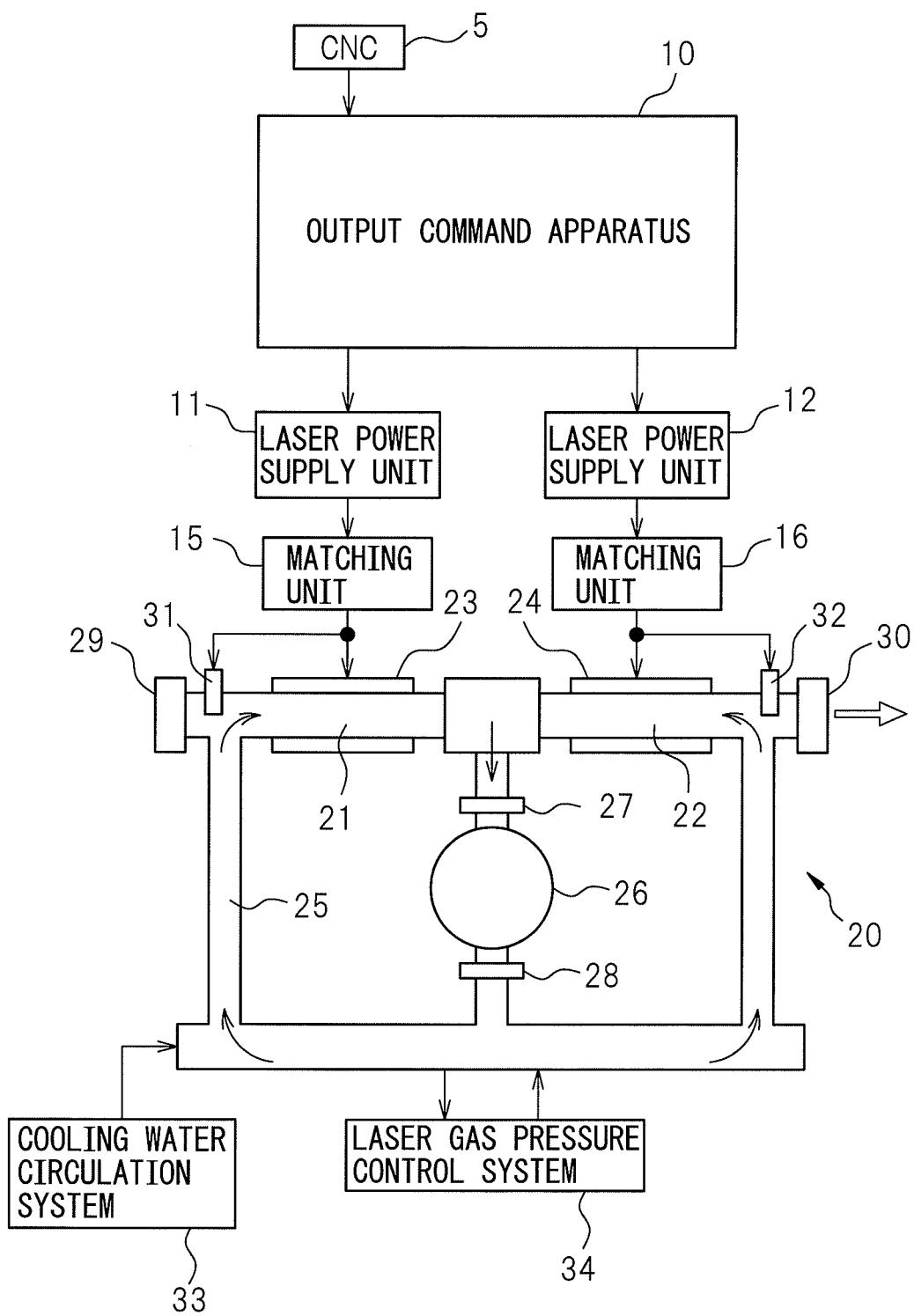
FIG. 1 is a schematic diagram of a gas laser oscillator based on the present disclosure.

Hereinafter, embodiments of the present invention will be described with reference to accompanying drawings. The same references are assigned to the same components in the drawings and following description. In order to understand easily, the scale of the drawings has been suitably changed.

FIG. 1 is a schematic diagram of a gas laser oscillator based on the present disclosure. The laser oscillator 20 in the present disclosure is a discharge excitation type gas laser oscillator having a comparatively high-output. The laser light output from the laser oscillator 20 is used for processing a workpiece (not illustrated) by a laser machine which is not illustrated.

As illustrated in the drawing, a laser gas circulation pass 25 of the laser oscillator 20 includes discharge tubes 21, 22. The laser gas circulation pass 25 is connected to a laser gas pressure control system 33 and, the laser gas pressure control system 33 controls the pressure for the laser gas circulation pass 25 by supplying and discharging the laser gas thereto.

A turbo blower 26 is arranged in the laser gas circulation pass 25 and, heat exchangers 27, 28 are arranged upstream and downstream of the turbo blower 26 respectively. Furthermore, the laser oscillator 20 is connected to a cooling water circulation system 34. According to such configuration, the laser gas in the laser gas circulation pass 25, especially the laser gas in the discharge tubes 21, 22 and the like are appropriately cooled.

As illustrated in FIG. 1, a rear mirror 29 (inside mirror of a resonator) which is a partial reflector is provided at one end of one discharge tube 21 and, an output mirror 30 which is the partial reflector is provided at another end of another discharge tube 22.

The output mirror 30 is formed from ZnSe and, inner surface of the output mirror 30 is applied a partial reflecting coating as well as outer surface thereof is applied an antireflection coating.

The two discharge tubes 21, 22 mentioned above are located in an optical resonance space between the rear mirror 29 and the output mirror 30. Each of the discharge tubes 21, 22 is sandwiched by a pair of electrodes 23, 24. The electrodes 23, 24 are of the same size. The electrodes 23, 24 are metelized or metal member is attached thereto. Furthermore, auxiliary electrodes 31, 32 are arranged in each discharge tube 21, 22 upstream side of the laser gas from the electrodes 23, 24 respectively.

The common voltage is applied to the auxiliary electrodes 31, 32 and the electrodes 23, 24 of the discharge tubes 21, 22 through the matching units. As an auxiliary electric discharge by the auxiliary electrodes usually requires lower voltage than the voltage applied to the electrodes 23 and 24, the auxiliary electric discharge is maintained even if the electric discharge between the electrodes 23 and 24 disappears. In cases where the auxiliary electric discharge is maintained, even if the command level to the laser power supplies is caused to rapidly increase, it is possible to avoid excessive increases in discharge tube voltage and to prevent damage to the laser power supplies.

As illustrated in FIG. 1, the electrodes 23, 24 and the auxiliary electrodes 31, 32 are connected to the laser power supplies 11, 12 through the matching units 15, 16 respectively. The two laser power supplies 11, 12 are connected to a common output command apparatus 10. The output command apparatus 10 is connected to a CNC 5.

Figure 2:
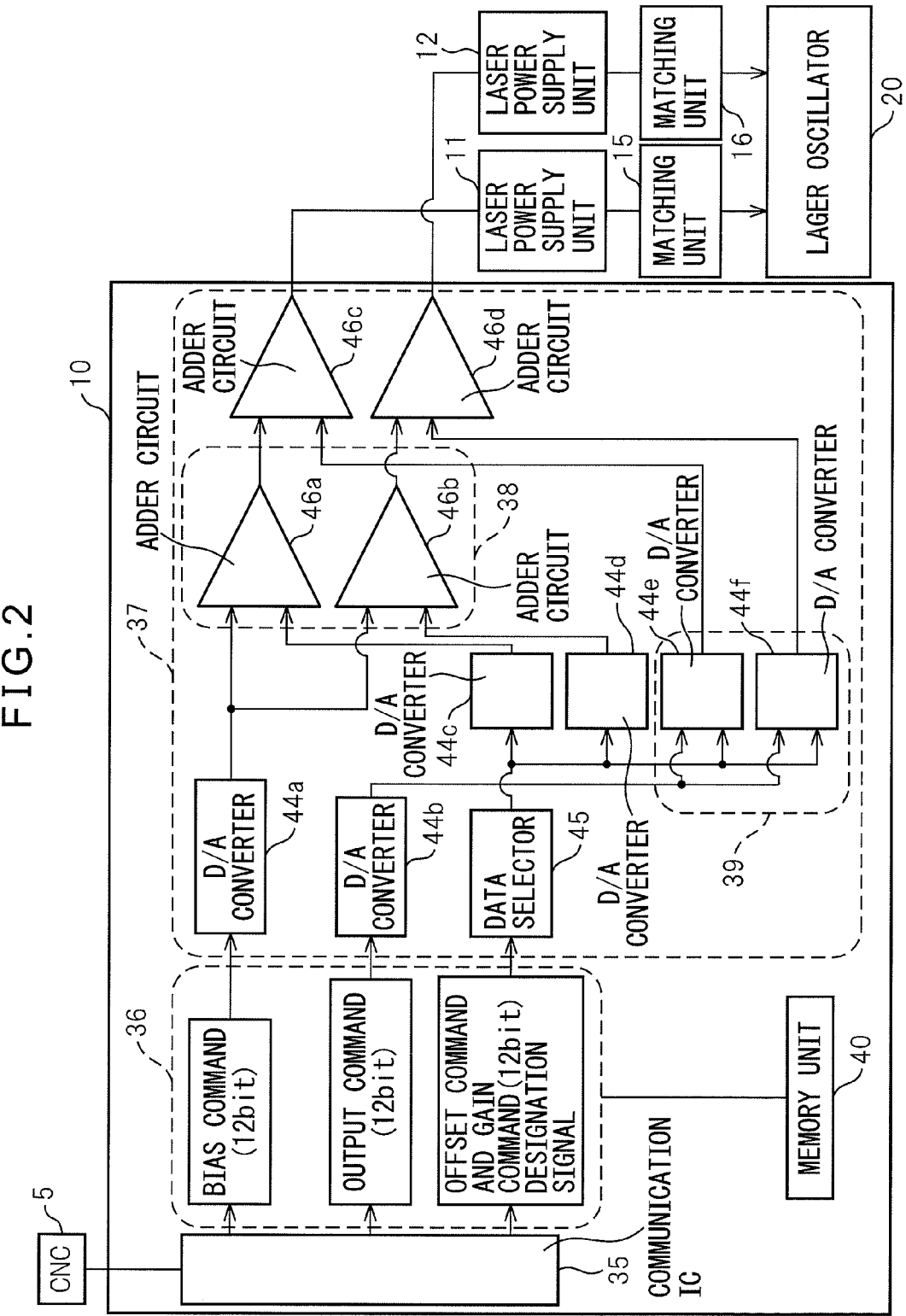
FIG. 2 is a functional block diagram of an output command apparatus illustrated in FIG. 1.

FIG. 2 is a functional block diagram of the output command apparatus illustrated in FIG. 1. As illustrated in FIG. 2, the output command apparatus 10 includes a communication IC 35 for communicating with the CNC 5. The communication IC 35 is coupled to a separating section 36 which separates the commands from CNC 5 into a bias command Cb, an output command Co, offset commands Cs and gain commands Cg.

In this connection, the bias command Cb is always commanded from the CNC 5 in a laser operational status (a state where a laser beam can be output) and has a certain command value. The output command Co is a command for controlling a laser output, and defines what W of laser beam is output from the laser oscillator 20. As the bias command Cb is set so that the laser output may become to zero W in the base discharge, it is possible to control the laser output to be desired power (W) by changing the output command Co to be added to the bias command Cb.

A high-speed control is required for the bias command Cb and the output command Co in a laser beam machining, thus a common value is used to the plurality of laser power supplies 11, 12. Moreover, command data update cycles of the bias command Cb and the output command Co are also maintained within certain shorter time.

On the contrary, the offset commands Cs and the gain commands Cg are values which are defined according to loads of corresponding laser power supplies 11, 12. As can be seen from FIG. 1, the laser power supply 11 is associated with the matching unit 15, the discharge tube 21 and the auxiliary electrode 31. Similarly, the laser power supply 12 is associated with the matching unit 16, the discharge tube 22 and the auxiliary electrode 32. These matching units, the discharge tubes, pressure in the discharge tubes and the auxiliary electrodes will be hereinafter referred to as loads of the laser power supplies.

The offset commands Cs corresponds to a variation amount in the characteristics of the load (the matching units, the discharge tubes, pressure in the tubes and the auxiliary electrodes) of each laser power supply 11, 12 with respect to the bias command Cb. The gain commands Cg corresponds to a variation amount in the characteristics of the load of each laser power supply 11, 12 with respect to the output command Co.

The loads of the laser power supplies 11, 12 changes in accordance with a variation in the characteristics of a capacitance and an inductance in the matching units 15, 16, a variation in diameters of the discharge tubes 21, 22, variations in the sizes of the auxiliary electrodes 31, 32 and pressure on the laser gas in the discharge tube 21, 22 (the flow velocity of the laser gas). Therefore, these loads have variations between the laser power supply 11 and the laser power supply 12. The variations of the loads exist according to the number of mounted laser power supplies.

In the present invention, a memory unit 40 is provided in the output command apparatus 10. Digital values of the offset commands Cs of each laser power supply and the gain commands Cg of each laser power supply are calculated automatically, and are stored in the memory unit 40, at the time of manufacturing the laser oscillator or replacing any load of the laser power supplies. Alternatively, the memory unit 40 may be provided in the CNC 5.

In addition, the designation signals for the offset commands Cs and the gain commands Cg are set from CNC software through the separating section 36. The designation signal 000 is for the offset commands Cs of the laser power supply 11. Similarly, the designation signal 001 is for the offset commands Cs of the laser power supply 12, the designation signal 010 is for the gain commands Cg of the laser power supply 11 and the designation signal 011 is for the gain commands Cg of the laser power supply 12.

It is only necessary to update the offset commands Cs and the gain commands Cg during the laser power supplies 11, 12 are subjected to adjustment and at the time of activating the laser oscillator 20. Thus, the offset commands Cs and the gain commands Cg are transmitted with any of the designation signals in serial and, are switched based on the designation signal transmitted therewith in turn. Generally, the updating cycle of command data gets slow as the number of laser power supplies increases. However, since the laser oscillator 20 is controlled mainly based on the bias command Cb and the output command Co, a control for the laser beam machining does not get delayed.

As illustrated in FIG. 2, the separating section 36 is coupled to the transmitting section 37. The transmitting section 37 includes a plurality of D/A converters 44a-44f, a data selector 45, and a plurality of adder circuits 46a-46d. The transmitting section 37 transmits various commands to the laser power supplies 11, 12 of the laser oscillator 20 respectively, without change or with change as described below. In addition, a serial transmission manner is adopted for the transmission of the offset commands Cs, the gain commands Cg and designation signals in the present invention.

Hereinafter, operations of the gas laser oscillator according to the present disclosure will be explained, with reference to FIG. 2.

The CNC 5 generates the command data for the laser oscillator 20 and, transmits generated command data to the communication IC 35 of the output command apparatus 10. Subsequently, the separating section 36 separates these commands into the bias command Cb, the output command Co, the offset commands Cs and the gain commands Cg.

As mentioned above, the bias command Cb and the output command Co have common values to the laser power supplies 11, 12. As can be seen from FIG. 2, the bias command Cb is applied a D/A conversion by the D/A converter 44a of the transmitting section 37, and converted command is input into the adder circuits 46a, 46b. The output command Co is applied the D/A conversion by the D/A converter 44b, and converted command is input into other D/A converters 44e, 44f.

On the contrary, the offset commands Cs and the gain commands Cg for each of laser power supplies 11, 12 are defined, the commands being stored in the memory unit 40 provided in the output command apparatus 10 or in the CNC 5. Furthermore, the designation numbers are set for the commands as mentioned above. These offset commands Cs, the gain commands Cg and the designation numbers are input into the data selector 45. The data selector 45 inputs the offset commands Cs and the gain commands Cg into the D/A converters 44c-44f in accordance with the laser power supplies 11, 12 respectively, based on the designation numbers.

Then, the offset commands Cs of the laser power supplies 11, 12 which are input into the D/A converters 44c, 44d respectively are applied the D/A conversion, and converted commands are input into the adder circuits 46a, 46b in that condition. On the contrary, in the D/A converter 44e, the output command Co of the laser power supply 11 is multiplied by the gain command Cg of the laser power supply 11 and, multiplied command is applied the D/A conversion. Similarly, in the D/A converter 44f, the output command Co of the laser power supply 12 is multiplied by the gain command Cg of the laser power supply 12 and, multiplied command is applied the D/A conversion.

Therefore, the D/A converters 44e, 44f serve a multiplication adjustment section 39 which multiplies the output command Co by the gain commands Cg to adjust the command. Then, the adjusted output command Co is input into the adder circuits 46c, 46d respectively.

As illustrated in FIG. 2, the adder circuit 46a adds the bias command Cb and the offset command Cs of the laser power supply 11. The adder circuit 46b adds the bias command Cb and the offset command Cs of the laser power supply 12. These adder circuits 46a, 46b serve an addition adjustment section 38 which adds the offset commands Cs to the bias command Cb to adjust the command. Subsequently, the bias commands Cb to which addition process is applied in the adder circuits 46a, 46b are input into different adder circuits 46c, 46d respectively.

As illustrated in FIG. 2, the adder circuit 46c adds the bias command Cb after the addition process (i.e., the bias command Cb in which the offset command of the laser power supply 11 has been considered), and the output command Co after the multiplication process (that is, the output command Co in which the gain command of the laser power supply 11 has been considered). The adder circuit 46c inputs the adding result into the laser power supply 11. Similarly, the adder circuit 46d adds the bias command Cb after the addition process (that is, the bias command Cb in which the offset command of the laser power supply 12 has been considered), and the output command Co after the multiplication process (i.e., the output command Co in which the gain command of the laser power supply 12 has been considered). The adder circuit 46c inputs the adding result into the laser power supply 12.

Thus, in the present invention, a set of the offset commands Cs and the gain commands Cg is transmitted to each laser power supply 11, 12 in serial for every certain control cycle, while common bias command Cb and output command Co are transmitted to each laser power supply. Thus, even in cases where there is large number of laser power supplies 11, 12, the update cycle of the commands does not get worse.

When adjusting the base discharge in the present invention, only the bias command Cb is transmitted and the output command Co is made to be a state of zero. Then, the offset commands Cs of the laser power supplies 11, 12, which have been distributed based on the designation signals, are changed from the state of zero. Digital values of the offset commands, according to which the discharge between the electrodes 23, 24 disappears but, the auxiliary discharge by the auxiliary electrodes 31, 32 is maintained, are calculated automatically and the digital values are stored in the memory unit 40. Furthermore, in the adder circuits 46a, 46b, the offset commands are added to the common bias command Cb. This allows to adjust the base discharge for each laser power supply 11, 12.

Moreover, in cases of adjusting the maximum injection power, at the time of commanding the maximum output (total of the bias command Cb and the output command Co), the gain commands Cg of laser power supplies 11, 12, which have been distributed based on the designation signals, are changed from the state of zero. Digital values of the gain commands, according to which injection power of each laser power supply becomes a certain value, are calculated automatically and the digital values are stored in the memory unit 40. Furthermore, in the D/A converters 44e, 44f, the gain commands are multiplied by the common output command Co. This enables to adjust the maximum injection power for each laser power supply 11, 12, and allows the laser oscillator 20 to have required maximum laser output. Thus, in the present invention, the variations in the loads of laser power supplies 11, 12 are absorbed by the offset commands Cs and the gain commands Cg.

Figure 3:
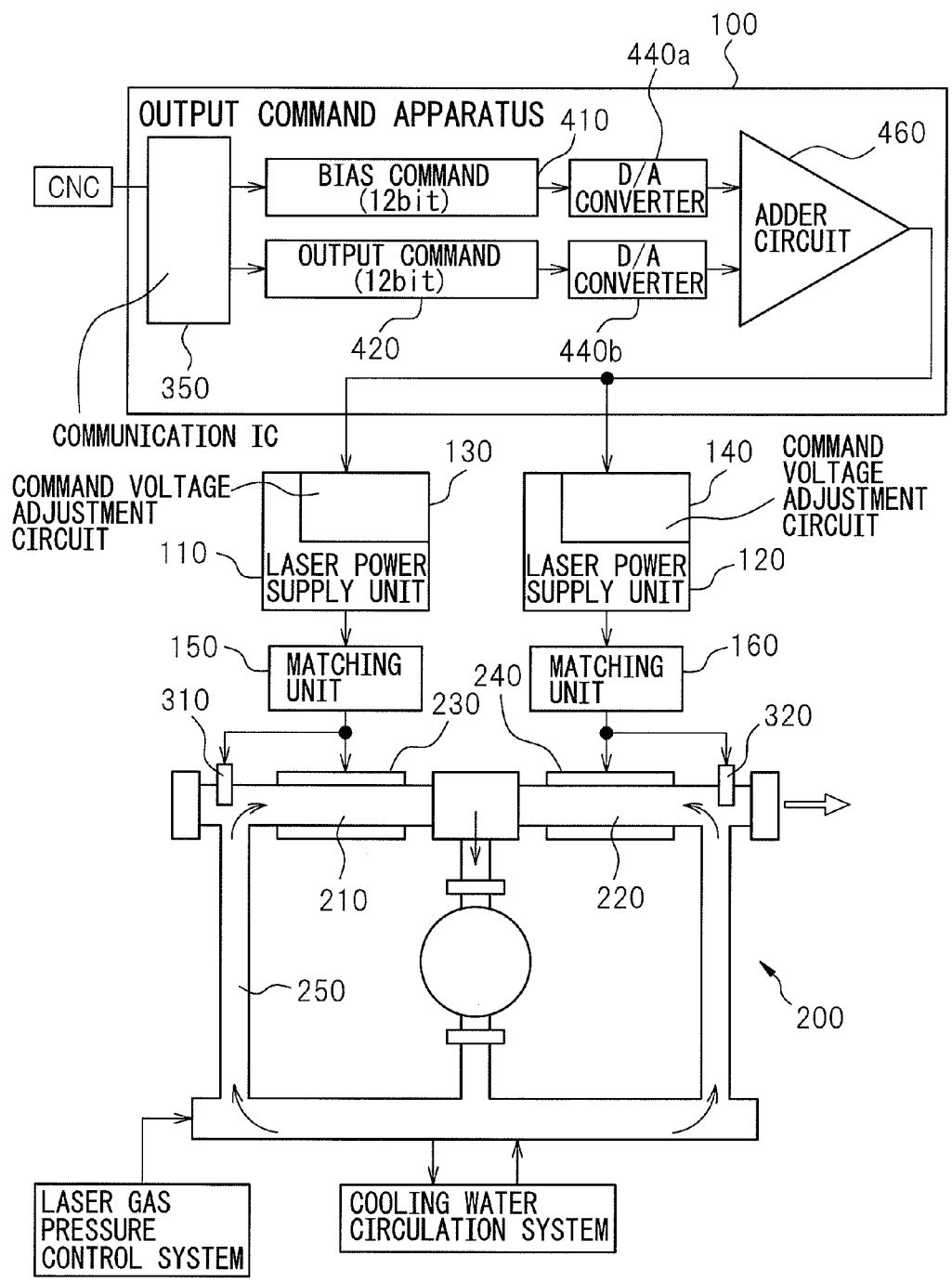
FIG. 3 is a diagram illustrating a gas laser oscillator in the related art.

In the related art, as illustrated in FIG. 3, the base discharge and the maximum injection power are adjusted by variable resistors for offset and gain of the analog command voltage adjustment circuits 130, 140 which are provided in the laser power supplies 110, 120 respectively. Therefore, it is difficult to manage the amounts of adjustments. Moreover, the adjustment operations of the offset and the gain is easily influenced by the variations in the command voltage adjustment circuits 130, 140, therefore it is required to adjust the base discharge and the maximum injection power whenever any of the laser power supplies 110, 120 is replaced.

On the contrary, in the present invention, the offset commands Cs and the gain commands Cg are managed as digital values. Therefore, it is possible to achieve the adjustment operations with high degree of accuracy, without appearing a difference in the adjustment operations according to an operator's level of skill.

Moreover, even if any of the laser power supplies 11, 12 is replaced due to its failure and the like, the loads of laser power supplies 11, 12, which are the matching units 15, 16, the discharge tubes 21, 22 and the auxiliary electrodes 31, 32 are not changed. Therefore, using the values of the offset commands Cs and the gain commands Cg stored in advance in the memory unit 40 does not require the adjustment operations of the laser power supplies themselves. Accordingly, the present disclosure allows the laser oscillator 20 to activate safely and quickly. Consequently, in the present disclosure, it is possible to avoid the processing defect for the workpiece and, damages of the laser power supplies, the matching units and the discharge tubes, according to an adjustment mistake.

Furthermore, in this disclosure, even if a plurality of, for example three or more of, laser power supplies are provided, it is only necessary to have the number of data items, the data items being (1) the bias command Cb (12 bits), (2) the output command Co (12 bits), (3) the offset commands Cs and the gain commands Cg (12 bits), and the designation signals. Thus, it is possible to easily command the plurality of laser power supplies regardless of the upper limit of the number of data items.

At this time, the offset commands Cs and the gain commands Cg are transmitted for each certain control cycle while the designation number is changed in turn such as 000, 001, 010 and 011 . . . That is, in one control cycle, only offset commands Cs or gain commands Cg corresponding to one designation signal is transmitted. Therefore, adjustment time does not vary between a case in which a single laser power supply is adjusted and a case in which the plurality of laser power supplies are adjusted. Thus, adjustment operations can be completed in similar adjustment time.

Furthermore, even if the loads vary, for example, a setup of the pressure of the laser gas in the discharge tubes 21, 22 is changed, it is possible to automatically adapt to variation of the loads of the laser power supplies as the offset commands and gain commands according to load are stored in advance.

Effects Of Invention

According to the first aspect, a set of the offset commands and gain commands is transmitted to each of the laser power supplies in serial, while the same values of the bias command and the output command are transmitted to each of the laser power supplies. Therefore, even if there is a large number of laser power supplies, the cycle for updating the bias command and the output command does not get worse. In addition, since the offset commands and gain commands are transmitted in serial, the number of data items which should be transmitted do not change even in a laser oscillator including a plurality of laser power supplies as well as a laser oscillator including one laser power supply. In other words, only similar adjustment time is required regardless of the number of the laser power supplies provided.

According to the second aspect, since the variations in specific loads of the laser power supplies are adjusted in the output command apparatus using the offset commands and the gain commands, the command voltage adjustment circuits 130, 140 are not required. In this connection, the specific loads of the laser power supplies are any of the matching units, the discharge tubes, and the pressure in the discharge tubes and the auxiliary electrodes and the like. In addition, since the offset commands and the gain commands are defined according to the load of each laser power supply, even if any of the laser power supplies is replaced due to its failure, it is possible to activate the laser oscillator safely using the values of original offset commands and the gain commands which are stored at the time of manufacturing the laser oscillator. Moreover, it is possible to prevent a processing defect and damages of the laser power supplies according to the adjustment mistake before they occur. Furthermore, even if the loads change, for example even if the setup of the pressure of the laser gas in the discharge tubes is changed or any of the matching units, the discharge tubes and the auxiliary electrodes is deteriorated and replaced, it is possible to easily adapt to the variations in the loads by changing the setup of the offset commands and the gain commands in accordance with the loads.

According to the third aspect, it is possible to more precisely control by managing the digital values of the offset and gain commands which are defined in accordance with the loads.

Although the present invention has been explained using the typical embodiments, it is to be understood by those skilled in the art that various changes mentioned above, other various changes, abbreviation and addition may be made without departing from the spirit and scope of the present invention.

The invention claimed is:

1. A command apparatus for a plurality of laser power supplies in a gas laser oscillator including a plurality of discharge tubes and a plurality of electrodes corresponding to the plurality of discharge tubes, the command apparatus comprising:
   a command generating section generating commands for the plurality of laser power supplies; and
   a separating section separating the commands generated by the command generating section into a bias command, an output command, an offset command and a gain command,
   wherein the bias command has a certain command value, which is always commanded from the command generating section in a laser operational status, the output command is a command for controlling a laser output, the offset command corresponds to a variation amount in the characteristics of the load of each of the laser power supplies with respect to the bias command and the gain command corresponds to a variation amount in the characteristics of the load of each of the laser power supplies with respect to the output command;
   wherein the bias command and the output command are common to the plurality of laser power supplies,
   the offset command and the gain command are defined at least in accordance with the discharge tubes corresponding to the plurality of laser power supplies respectively,
   wherein the command apparatus further comprises a transmitting section transmitting, to each of the plurality of laser power supplies, the bias command and the output command which are common to the plurality of laser power supplies and, transmitting, in serial, the offset command and the gain command which are defined at least in accordance with the discharge tubes corresponding to the plurality of laser power supplies respectively, corresponding to each of the plurality of laser power supplies.

2. The command apparatus in the laser oscillator according to claim 1 wherein the transmitting section includes:
   an addition adjustment section adding the offset command which is defined in accordance with at least one of the discharge tubes and the electrodes corresponding to the plurality of laser power supplies respectively to the bias command which is common to the plurality of laser power supplies, to adjust a base discharge in the laser oscillator; and
   an multiplication adjustment section multiplying the gain command which is defined in accordance with at least the discharge tubes corresponding to the plurality of laser power supplies respectively by the output command which is common to the plurality of laser power supplies, to adjust a maximum injection power in the laser oscillator.

3. The command apparatus in the gas laser oscillator according to claim 1 wherein
   the laser oscillator includes a plurality of matching units arranged between each of the plurality of laser power supplies and the laser oscillator and, auxiliary electrodes arranged adjacent to each of the plurality of electrodes,
   the offset command and the gain command are defined at least in accordance with one of the discharge tubes, pressure of the discharge tubes, the matching units and the auxiliary electrodes, each of which corresponds to the plurality of laser power supplies respectively.

* * * * *